United States Patent

Cavka

[19]

[11] Patent Number: 5,944,323
[45] Date of Patent: Aug. 31, 1999

[54] SEALING RING

[75] Inventor: Elvir Cavka, Värnamo, Sweden

[73] Assignee: Forsheda AB, Forsheda, Sweden

[21] Appl. No.: 08/940,392

[22] Filed: Oct. 1, 1997

[30] Foreign Application Priority Data

Oct. 17, 1996 [SE] Sweden ................................. 9603822

[51] Int. Cl.⁶ ....................................................... F16J 9/00
[52] U.S. Cl. ......................... 277/626; 277/602; 277/604; 277/608; 277/609; 277/630; 277/644
[58] Field of Search ..................................... 277/602, 604, 277/608, 609, 626, 630, 644

[56] References Cited

U.S. PATENT DOCUMENTS

| | | |
|---|---|---|
| 2,398,399 | 4/1946 | Alexander . |
| 3,390,890 | 7/1968 | Kurtz . |
| 3,510,140 | 5/1970 | Hermann . |
| 4,182,519 | 1/1980 | Wilson ..................................... 277/626 |
| 4,223,895 | 9/1980 | Roberts, Jr. et al. . |
| 4,690,414 | 9/1987 | Haaland . |
| 5,417,442 | 5/1995 | Jornhagen ................................. 277/626 |
| 5,507,504 | 4/1996 | Neumann ................................. 277/626 |
| 5,626,349 | 5/1997 | Sutherland ................................. 277/626 |

Primary Examiner—Anthony Knight
Assistant Examiner—Agatha Youmans
Attorney, Agent, or Firm—Baker & Daniels

[57] ABSTRACT

A sealing ring for sealing a space between two substantially cylindrical space surfaces (36, 44) axially introducable one into the other comprises two annular sealing portions (2, 4) concentrically connected with each other. The sealing portions have one sealing surface (14, 16) each adapted to engage one space surface (44, 36) each. In its relaxed condition the sealing ring forms a recess (22) between the sealing portions (2, 4) and when this recess (22) is closed substantially without a compression of the sealing ring, the sealing surfaces (14, 16) take a substantially parallel position in relation to the space surfaces (44, 36), respectively. This provides that the sealing ring will at the compression between the space surfaces (44, 36) be subjected to a substantially uniform compression over the main part of its section.

20 Claims, 3 Drawing Sheets

SEALING RING

The present invention relates to a sealing ring for sealing an annular space between two substantially cylindrical space surfaces axially displaceable one into the other, said space surfaces being preferably positioned at the inner surface of a socket and the outer surface of a spigot end at the end portions of two pipes, well rings or the like.

Many different types of sealing rings for sealing the annular space between a socket and a spigot end of a pipe joint are previously known. The prior art sealing rings are of two main types, rolling rings and sliding rings. Both these types of sealing rings are positioned on one of the space surfaces, the sealing ring guiding the space surfaces to a concentric position in relation to each other when the space surfaces are introduced one into the other, while the sealing ring is compressed between the space surfaces at the continued axial introduction of the space surfaces one into the other. Said compression provides for the necessary tightness of the pipe joint.

The sealing ring according to the present invention is of the sliding type in which one of the space surfaces slides against the sealing ring tensioned onto the other space surface during the introduction of the surfaces one into the other and comprises two annular sealing portions connected with each other in a concentric position and having one sealing surface each for directly or indirectly sealingly engaging one space surface each. In the relaxed condition of the sealing ring the sealing surfaces form an angle in relation to each other so that the peripheral edge portions of the sealing ring positioned at an axial distance from each other form one narrower and one wider edge portion. Subsequently to the positioning of the sealing ring on one of the space surfaces with one of the sealing surfaces in sealing engagement therewith the other sealing surface of the sealing ring will form a conical surface having increasing diameter in the direction of the introduction of the space surfaces one into the other, said surface guiding the space surfaces to a concentric position in relation to each other during the introduction movement. When the introduction movement is completed the sealing ring will be compressed between the space surfaces. In order to provide the conical shape required for providing the guiding of the space surfaces to a concentric position in relation to each other during the introduction movement and at the same time maintaining the jointing force necessary for the introduction movement at a reasonable value it is previously known to design the sealing ring so that the sealing ring forms in its relaxed condition a recess which is closed at the introduction of the space surfaces one into the other by the fact that a part of the sealing ring is deflected.

In addition to the requirement for the necessary compression in order to provide that the sealing surfaces of the sealing ring are forced against the space surfaces with sufficient pressure for maintaining the tightness of the joint and the requirement for a reasonable jointing force there is especially when using the sealing ring for pipes having a coarse and irregular surface, for example concrete pipes, the desire that the sealing surfaces of the sealing ring shall engage the space surfaces of the pipes over relatively large areas. Thereby, the risk for untightness in the joint as a consequence of the irregularities of the space surfaces is reduced. The desire for a large area of the contact surfaces between the sealing surfaces of the sealing ring and the space surfaces of the pipes has so far been fulfilled by dimensioning the sealing ring and the space between the space surfaces in such a way in relation to each other that an increased compression of the sealing ring in the space has been provided. However, the drawback of such an increased compression is a resulting high jointing force and as a consequence thereof a risk of bursting a pipe socket especially when the pipe joint includes concrete socket pipes.

The object of the present invention is to provide a sealing ring of the kind mentioned above in which the tightness of the pipe joint is provided by means of a large contact area between the sealing surfaces of the sealing ring and the space surfaces at a substantially small compression of the sealing ring. Thereby, there is provided a sealing ring which in spite of the fact that the ring offers great security against leakage in the pipe joint complies with the desire for a low jointing force as a consequence of the relatively small compression which is required for providing the necessary tightness.

In order to comply with this object the sealing ring according to the invention is characterized in that the sealing surfaces of the sealing ring substantially without a compression of the sealing ring take a position substantially parallel with the space surface belonging thereto when the recess of the sealing ring is closed so that the sealing ring is at the compression between the space surfaces of the space subjected to a substantially uniform compression over the main part of its section. Thus, a sealing ring according to the invention differs from prior art sealing rings in the respect that the sealing ring presents a substantially uniform compression and as a consequence thereof uniform surface pressure over its axial length which is in opposition to the condition of conventional sealing rings in which the compression of the sealing ring and as a consequence thereof the surface pressure between the sealing surfaces and the space surfaces increase in the direction of introduction from one edge of the sealing ring to the other edge of the sealing ring.

Preferably the sealing ring according to the invention comprises two sealing ring portions concentrically connected with each other and forming two in section basically triangular portions each forming a base and an opposite point. The triangular portions are connected with each other at a corner positioned at the base of the first triangular portion and at the point of the other triangular portion, the sealing ring portions engaging each other when the recess is closed for forming a section of the sealing ring which is formed substantially as a trapezoid in which the line of separation between the triangular sealing ring portions is positioned on a diagonal of the trapezoidal section.

Preferably, the surface portions forming the recess are of convex and concave shape, respectively, one of the surface portions starting from the point of one of the sealing ring portions and being of concave shape and the other of the surface portions forming the recess starting from a corner of the base of the other sealing ring portion and being of convex shape.

In order to facilitate the deflection movement of the sealing ring portions of the sealing ring in relation to each other necessary for closing the recess, a groove is formed in the sealing ring at the narrow edge portion of the sealing ring in the relaxed position of the sealing ring, the groove being formed between the point of the other of the triangular sealing ring portions and one of the edges of the base of the first of the sealing ring portions in the case that the sealing ring portions of the sealing ring are constituted by two portions having a basically triangular cross section.

The invention shall be described in the following with reference to the accompanying drawings.

Figure 1:
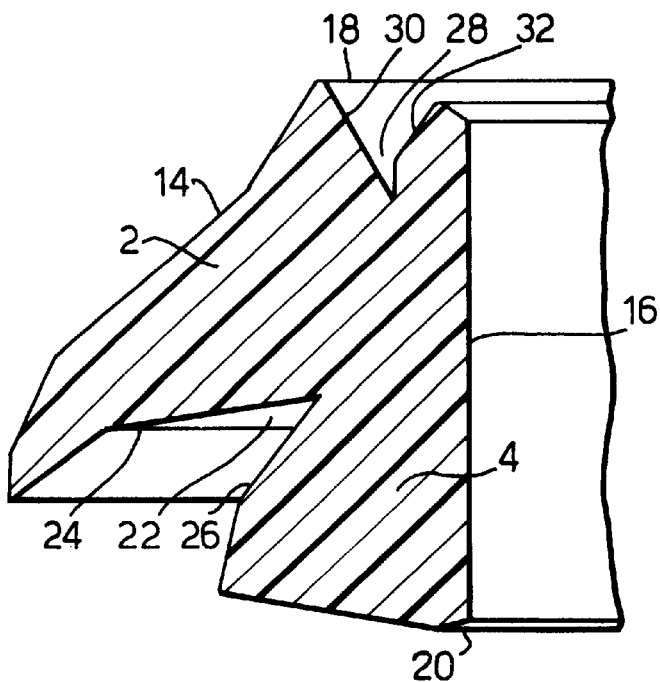
FIG. 1 is a section of an embodiment of a sealing ring according to the invention.

The sealing ring according to the invention shown in FIG. 1 is intended for sealing an annular space between two substantially cylindrical space surfaces axially introducable one into the other, one of the surfaces being positioned at the inner surface of a concrete pipe socket and the other being positioned at the outer surface of a spigot end of a concrete pipe. The sealing ring consists of two annular sealing ring portions 2 and 4 concentrically connected with each other and having, as shown with dash dotted lines in FIG. 2, a section which is formed substantially by two portions of basically triangular substantially congruent shape. The portions 2 and 4 of basically triangular shape form a base 6 and 8 respectively, and a point 10 and 12, respectively. The sealing ring portions 2 and 4 are connected with each other at a corner positioned at the base 6 of the sealing ring portion 2 and close to the point 12 of the other sealing ring portion 4. The sealing ring portion 2 forms an outer sealing surface 14, while the sealing ring portion 4 forms an inner sealing surface 16. In the relaxed condition of the sealing ring shown in FIGS. 1 and 2, the sealing surfaces 14 and 16 form an angle with each other so that the peripheral edge portions of the sealing ring, positioned at an axial distance from each other will form a narrow edge portion 18 and a wide edge portion 20. At its wide edge portion 20 the sealing ring is provided with a peripheral recess 22 which as a wedge tapers from its opening towards its bottom. The recess 22 is defined by a concave surface 24 on the sealing ring portion 2 in connection with the point 10 thereof and a convex surface 26 on the sealing ring portion 4 in connection with the base 8 thereof.

At its narrow edge portion 18 the sealing ring has a peripherally extending groove 28 which like the recess 22 as a wedge tapers from its opening towards its bottom but has substantially smaller dimensions than the recess 22. The groove 28 is defined by a surface 30 constituting a portion of the base 6 of the sealing ring portion 2 and a surface 32 constituting a part of a side surface of the sealing ring portion 4 in connection with the point 12 thereof.

Figure 2:
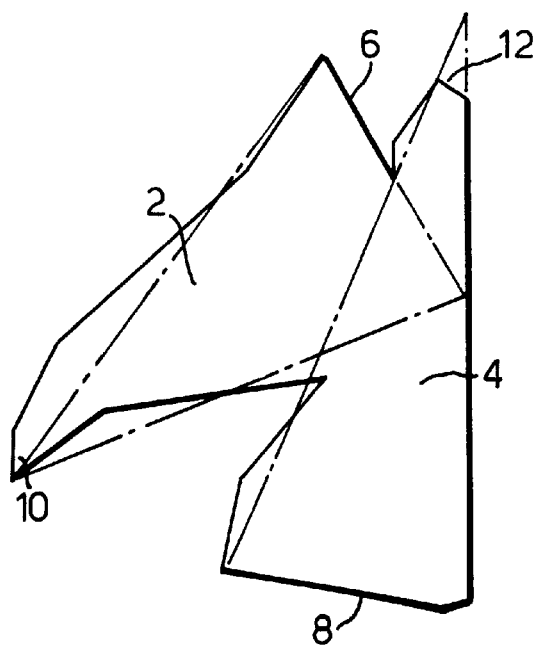
FIG. 2 is a section of the sealing ring according to FIG. 1 in which dash dotted lines illustrate that the sealing ring is in principle formed by two sealing ring portions having triangular cross sections.
Figure 3:
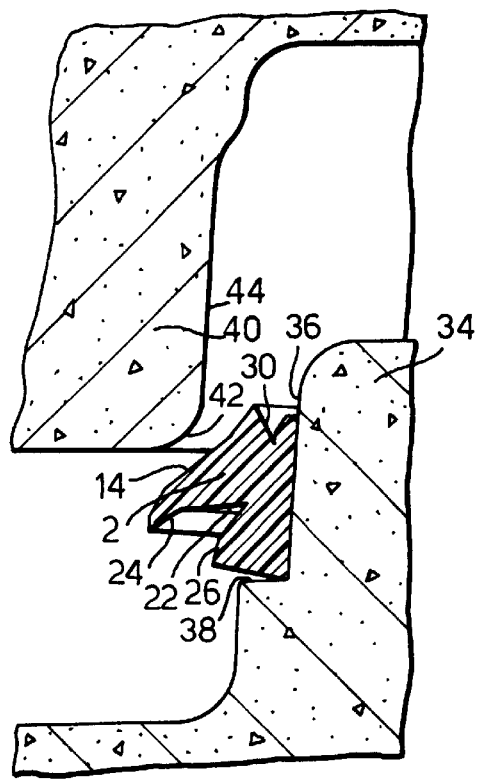
FIG. 3 shows the sealing ring according to FIGS. 1 and 2 tensioned onto a spigot end of a concrete pipe prior to the introduction thereof into a socket of a second concrete pipe for forming a pipe joint.
Figure 4:
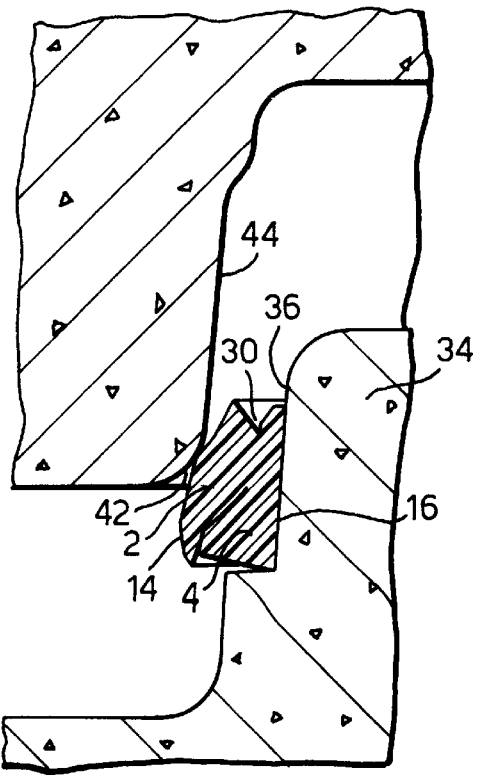
FIG. 4 is a section corresponding to FIG. 3 of a spigot end and a socket, a sealing ring being tensioned onto the spigot end according to FIGS. 1 and 2 at the initial stage of the axial introduction of the spigot end into the socket.

When the sealing ring according to FIGS. 1 and 2 shall be used for sealing a pipe joint it is, as appears from FIG. 3, tensioned onto a spigot end 34 of a concrete pipe with the sealing surface 16 of the sealing ring portion 4 contacting a space surface 36 of the spigot end 34 while being supported against a shoulder surface 38 thereon. In the position of FIG. 3 in which the sealing ring is tensioned onto the spigot end the sealing surface 14 of the sealing ring forms on the sealing ring portion 2 a guiding surface widening conically from the free end surface of the spigot end 34. When establishing the pipe joint, a socket 4 of a connecting concrete pipe is axially displaced towards the spigot end 34, the conical guiding surface formed by the sealing surface 14 thereby guiding the socket 40 to a concentric position in relation to the spigot end 34. When the corner 42 of the socket 40 arrives into engagement with the sealing ring at the sealing surface 14 of the sealing ring portion 2, the sealing ring portion 2 is deflected counter clockwise in FIGS. 3 and 4 to the position shown in FIG. 4 in which the recess 22 is closed while there is an engagement between the surfaces 24 and 26 forming the recess 22. According to the invention the recess 22 and the sealing ring portions 2 and 4 are dimensioned so that the sealing surfaces 14 and 16 in the closed position of the recess 22 shown in FIG. 4, substantially before the sealing ring is subjected to a compression take positions in which the sealing surfaces are substantially parallel with the space surfaces 44 and 36, respectively. In the position shown in FIG. 4 in which the recess 22 is closed substantially without any compression of the sealing ring, the sealing ring portions 2 and 4 form a substantially trapezoidal section of the sealing ring in which the line of separation between the sealing ring portions 2 and 4, i.e. the section of the contact surface to between the surfaces 24 and 26, is positioned on one of the diagonals of the trapezoidal section.

Figure 5:
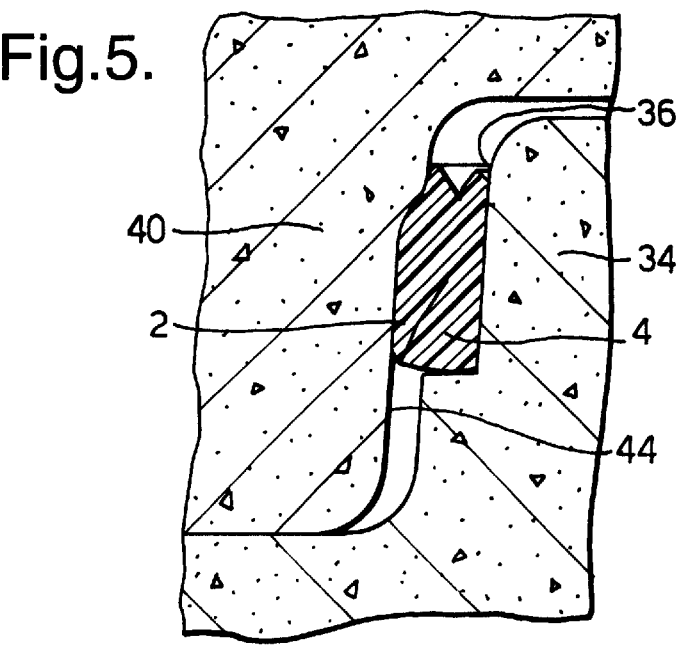
FIG. 5 is a section corresponding to FIGS. 3 and 4 of a spigot end and a socket subsequently to the establishment of a pipe joint including a sealing ring according to FIGS. 1 and 2 compressed in the pipe joint.

The fact that the sealing surfaces 14 and 16 take a substantially parallel position in relation to the space surfaces 44 and 36, respectively, substantially without compression of the sealing ring, when the recess 22 is closed, provides that the sealing ring, subsequent to the assembly of the space surfaces 36 and 44 according to FIG. 5 compressed between the space surfaces 36 and 44, is subjected to a substantially uniform compression over its whole extension which in turn provides that the surface pressure between the sealing surfaces 14 and 16 and the space surfaces 44 and 36, respectively, will be substantially the same over the complete area of the sealing surfaces 14 and 16. This provides for an increased security with regard to the sealing capacity of the sealing ring also at a relatively moderate highest compression of the sealing ring in the space between the space surfaces 36 and 44. In turn this provides that the compression can be kept at a relatively low value with maintained tightness which in turn provides that the jointing force necessary for establishing the pipe joint, i.e. the assembly of the space surfaces 36 and 44, will be relatively small. This fact does not only facilitate the assembly of the joint but also reduces the risk of socket bursting.

Figure 6:
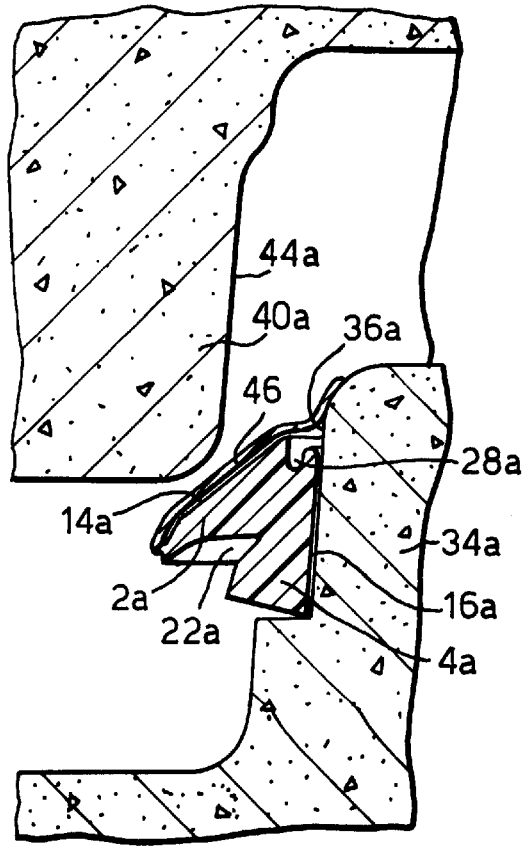
FIG. 6 is a section corresponding to FIG. 3 of a spigot end and a socket showing a modified embodiment of the sealing ring according to the invention tensioned onto a spigot end.

The embodiment of the sealing ring according to the invention shown in section in FIG. 6 consists like the sealing ring according to FIGS. 1–5 of two sealing ring portions 2a and 4a having basically triangular sections including sealing surfaces 14a and 16a, respectively. The sealing ring according to FIG. 6 has like the sealing ring according to FIGS. 1–5 a peripherally extending recess 22a, the angle between the sealing surfaces 14a and 16a, the design of the sealing ring portions 2a and 4a, and the design of the recess 22a being like in the sealing ring according to FIGS. 1–5 such that the sealing surfaces 14a and 16a, respectively, will at the closing of the recess 22a take a parallel position in relation to the space surfaces 44a and 36a, respectively, substantially without any compression of the sealing ring. The groove 28a at the narrow edge of the sealing ring according to FIG. 6 is of somewhat other design than the groove 28 in the sealing ring according to FIGS. 1–5 but provides in all essential respects the same function as this groove, namely the function of facilitating deflection of the sealing ring portion 2a in relation to the sealing ring portion 4a at the establishment of the pipe joint.

The difference between the sealing ring according to FIG. 6 and the sealing ring according to FIGS. 1–5 is that the sealing ring according to FIG. 6 is provided with a sliding skin 46 which is connected with the point 10a of the sealing ring portion 2a, and therefrom extends over the sealing surface 14a of the sealing ring portion 2a to an engagement with the space surface 36a of the spigot end. The sliding skin 46 has the object of facilitating the axial displacement of the socket 34a in relation to the spigot end 40a by the fact that the space surface 44a of the socket will indisplacably engage the sliding skin 46 when the socket has been displaced into engagement with the sealing ring, the sliding skin in turn sliding against the sealing surface 14a during the jointing movement. Depending upon the length of the sliding skin 46 and also depending upon the socket 40a is in an eccentric or a concentric position in relation to the spigot end 34a when the jointing movement is initiated, the sliding skin 46 can subsequently to the completing of the jointing movement either have been displaced completely past the sealing surface 14a of the sealing ring or can close to its free edge be positioned between the sealing surface 14a and the opposite space surface 44a. In the case that the sliding skin 46 is positioned between the sealing surface 14a and the space surface 44a the engagement of the sealing surface 14a with the space surface 44a can be considered to be indirect instead of direct. As to the remaining element the sealing ring according to FIG. 6 presents the same functional advantages as the sealing ring according to FIGS. 1–5.

The sealing ring according to the invention can be modified in several respects within the scope of the following claims. Thus, the sealing ring can consist of more sealing ring portions than two, and the sealing ring portions can be designed in another way than with a basically triangular cross section. Important is only that the sealing surfaces in the relaxed condition of the sealing ring form a narrower and a wider edge portion, and that the sealing surfaces of the sealing ring will at the closure of the recess or recesses positioned at the wide edge of the sealing ring without compression of the sealing ring take a substantially parallel position in relation to the respective space surface so that the sealing ring is at the compression between the space surfaces in the space subjected to the substantially uniform compression over the main part of its section, which represents the main principle according to the present invention.

I claim:

1. A sealing ring for sealing an annular space between two substantially cylindrical space surfaces (36, 44), axially introducable one into the other and preferably arranged at the inner surface of a socket and the outer surface of a spigot end at the end portions of two pipes or well rings, comprising two annular sealing ring portions (2, 4) concentrically connected with each other and each having a sealing surface (14, 16) for a direct or indirect sealing engagement with the respective space surfaces (44, 36), the sealing surfaces (14, 16) forming in the relaxed position of the sealing ring an angle with each other so that the peripherally extending edge portions of the sealing ring form a narrow and a wide edge portion (18, 20) positioned at an axial distance from each other, the sealing ring forming in its relaxed position a recess (22) between the sealing portions (2, 4) at the wide edge portion (20) of the sealing ring, characterized in that the sealing surfaces (14, 16) take at the closure of the recess (22) substantially without compression of the sealing ring a substantially parallel position in relation to the respective space surfaces (44, 36) so that the sealing ring is at a compression in the space between the space surfaces (44,36) subjected to a substantially uniform compression over the main part of its section; wherein the outermost annular sealing portion (2) is caused to pivot upon insertion into socket (40) so that outermost sealing portion (2) is not substantially compressed.

2. A sealing ring as claimed in claim 1, characterized in that the two annular sealing ring portions (2, 4) are constituted by two portions, each portion having a substantially triangular cross section, each forming a base (6, 8) and an opposite point (10, 12) and being connected with each other at a corner positioned at the base (6) of the first triangular portion (2) and the point (12) of the other triangular portion (4), the sealing ring portions (2, 4) contacting each other at the closure of the recess (22) for forming a substantially trapezoidal section of the sealing ring in which the separation line between the triangular sealing ring portions is positioned on a diagonal of the trapezoidal section.

3. A sealing ring as claimed in claim 2, characterized in that the surface portions (24, 26) forming the recess (22) are of opposing concave and convex shapes, respectively.

4. A sealing ring as claimed in claim 3, characterized in that one (24) of the surface portions forming the recess starts from the point (10) of the first (2) sealing ring portion and is of concave shape and that the other (20) of the surface portions forming the recess starts from a corner of the base (8) of the other sealing ring portion (4) and is of convex shape.

5. A sealing ring as claimed in claim 2, characterized in that the sealing ring portions (2, 4) of basically triangular cross section have point angles of substantially the same magnitude.

6. A sealing ring as claimed in claim 2, characterized in that a groove (28) is formed at the narrow edge portion (18) of the sealing ring in the relaxed condition of the sealing ring.

7. A sealing ring as claimed in claim 6, characterized in that the groove (28) is formed between the point (12) of the other (4) of the triangular sealing ring portions and one corner of the base (6) of the first (2) of the sealing ring portions.

8. A sealing ring as claimed in claim 2, characterized by a sliding skin (46) which is adapted to slide between one sealing surface (14a) of the sealing ring and the opposite space surface (44a) at the axial introduction of the space surface (36a, 44a) one into the other.

9. A sealing ring as claimed in claim 8, characterized in that the sliding skin (46) is adapted subsequently to the axial introduction of the space surfaces one into the other to take a position in which the sliding skin completely or partly is positioned between one of the sealing surfaces (14a) and the opposite space surface (44a).

10. A sealing ring as claimed in claim 8, characterized in that the sliding skin (46) is connected with the point (10a) of the first (2a) of the triangular sealing ring portions.

11. A sealing ring as claimed in claim 1, characterized in that the sealing ring is adapted to be tensioned onto the outer surface (36) of the spigot end (34) of a first pipe with one of the sealing surfaces (16) in engagement with said outer surface and with the narrow edge portion (18) of the sealing ring positioned closest to the free end of the spigot end so that the second sealing surface (14) forms a surface which conically widens therefrom and is adapted at the axial introduction of the space surface one into the other to engage the inner surface (44) of the socket of second pipe, the sealing surfaces (14, 16) being as a consequence of the introduction of the spigot end into the socket displaced to the substantially parallel position and being compressed between the space surfaces.

12. A sealing ring as claimed in claim 1, characterized in that the surface portions (24, 26) forming the recess (22) are of concave and convex shape, respectively.

13. A sealing ring as claimed in claim 2, characterized in that one (24) of the surface portions forming the recess starts from the point (10) of the first (2) sealing ring portion and is of concave shape and that the other (20) of the surface portions forming the recess starts from a corner of the base (8) of the other sealing ring portion (4) and is of convex shape.

14. A sealing rings as claimed in claim 1, characterized in that the groove (28) is formed between the point (12) of the other (4) of the triangular sealing ring portions and one corner of the base (6) of the first (2) of the sealing ring portions.

15. A sealing ring as claimed in claim 1, characterized in that the sliding skin (46) is connected with the point (10*a*) of the first (2*a*) of the triangular sealing ring portions.

16. A sealing ring as claimed in claim 2, characterized in that the sliding skin (46) is connected with the point (10*a*) of the first (2*a*) of the triangular sealing ring portions.

17. A sealing ring as claimed in claim 2, characterized in that the sealing ring is adapted to be tensioned onto the outer surface (36) of the spigot end (34) of a first pipe with one of the sealing surfaces (16) in engagement with said outer surface and with the narrow edge portion (18) of the sealing ring positioned closest to the free end of the spigot end so that the second sealing surface (14) forms a surface which conically widens therefrom and is adapted at the axial introduction of the space surface one into the other to engage the inner surface (44) of the socket of second pipe, the sealing surfaces (14, 16) being as a consequence of the introduction of the spigot end into the socket displaced to the substantially parallel position and being compressed between the space surfaces.

18. A sealing ring as claimed in claim 3, characterized in that the sealing ring is adapted to be tensioned onto the outer surface (36) of the spigot end (34) of a first pipe with one of the sealing surfaces (16) in engagement with said outer surface and with the narrow edge portion (18) of the sealing ring positioned closest to the free end of the spigot end so that the second sealing surface (14) forms a surface which conically widens therefrom and is adapted at the axial introduction of the space surface one into the other to engage the inner surface (44) of the socket of second pipe, the sealing surfaces (14, 16) being as a consequence of the introduction of the spigot end into the socket displaced to the substantially parallel position and being compressed between the space surfaces.

19. A sealing ring as claimed in claim 4, characterized in that the sealing ring is adapted to be tensioned onto the outer surface (36) of the spigot end (34) of a first pipe with one of the sealing surfaces (16) in engagement with said outer surface and with the narrow edge portion (18) of the sealing ring positioned closest to the free end of the spigot end so that the second sealing surface (14) forms a surface which conically widens therefrom and is adapted at the axial introduction of the space surface one into the other to engage the inner surface (44) of the socket of second pipe, the sealing surfaces (14, 16) being as a consequence of the introduction of the spigot end into the socket displaced to the substantially parallel position and being compressed between the space surfaces.

20. A sealing ring as claimed in claim 5, characterized in that the sealing ring is adapted to be tensioned onto the outer surface (36) of the spigot end (34) of a first pipe with one of the sealing surfaces (16) in engagement with said outer surface and with the narrow edge portion (18) of the sealing ring positioned closest to the free end of the spigot end so that the second sealing surface (14) forms a surface which conically widens therefrom and is adapted at the axial introduction of the space surface one into the other to engage the inner surface (44) of the socket of second pipe, the sealing surfaces (14, 16) being as a consequence of the introduction of the spigot end into the socket displaced to the substantially parallel position and being compressed between the space surfaces.

\* \* \* \* \*